C. WHITAKER.
ICE-MAKING APPARATUS.
No. 182,090. Patented Sept. 12, 1876.
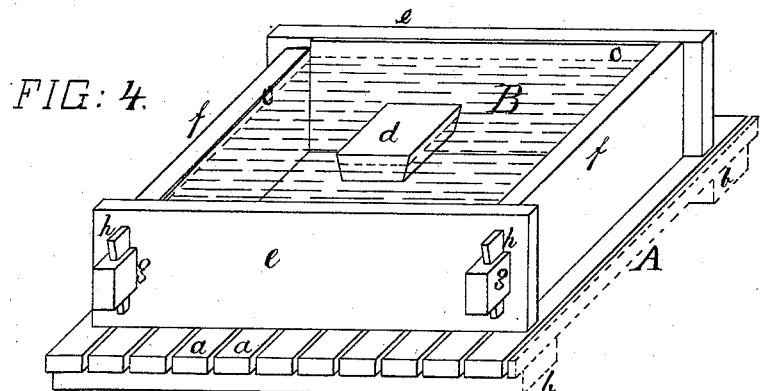
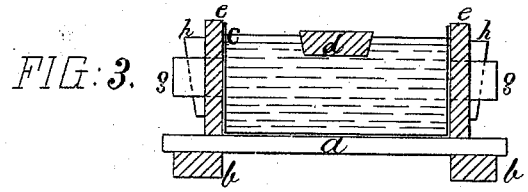
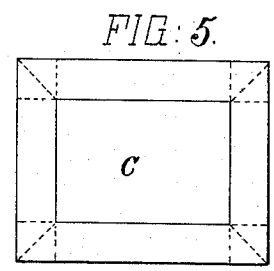
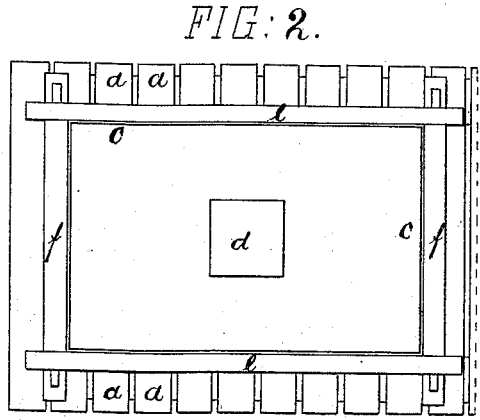
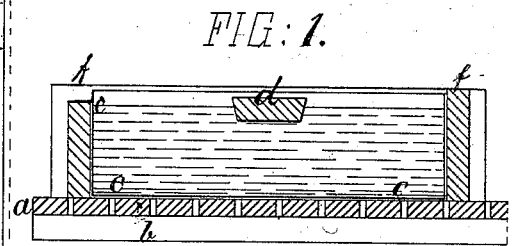
WITNESSES:
INVENTOR:
Charles Whitaker

UNITED STATES PATENT OFFICE.

CHARLES WHITAKER, OF DAVENPORT, IOWA.

IMPROVEMENT IN ICE-MAKING APPARATUS.

Specification forming part of Letters Patent No. 182,090, dated September 12, 1876; application filed February 28, 1876.

*To all whom it may concern:*

Be it known that I, CHARLES WHITAKER, of the city of Davenport, Scott county, State of Iowa, have invented certain new and useful Improvements in the Manufacture of Ice; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to the peculiar construction of freezing-molds and lining, and their combination for the freezing of water into cakes of ice of desired form by natural process, the object of the invention being the freezing of water in a mold so constructed and operated that freezing may go on equally from all sides, the molds have no tendency to break or part, and admit of the ready removal of the cakes of ice when frozen, and the disposal of surplus water.

B, Figure 4, is a view of the freezing-mold, constructed of four pieces, $e\ e$ and $f\ f$, which may be solid, as shown in figure, or constructed of slats or meshes, with sufficient openings to allow the freezing-air from all sides to reach the water placed in the mold, the sides and ends of mold being held together by tenon $g$ and key $h$. The mold is to be placed on the frame A, Fig. 4, constructed on pieces $b$ of slats $a\ a$, as shown, at suitable distances apart, to allow the freezing-air to reach from below the water placed in the mold. The water is to be run in the mold from above, and held there by means of the lining $c$, which is made of waterproof cloth, paper, or other flexible material, so made and formed as to fit the inside of the mold, or folded for that purpose, as shown in Fig. 5, the inside lines and dots showing where the folds are made to fit the lining into the mold, said lining to be greased to allow of ready removal from ice.

When freezing is in process, to prevent expansion of the water from bursting or parting the mold, a vent is kept open in the upper surface of the ice, thus allowing surplus water to escape, said vent to be kept open by the vent-block $d$, which is floated on the water with narrow side down, and, when ice is formed around it, to be removed, and the vent so made to be kept open by dipping or otherwise removing sufficient water therefrom during the process of freezing, to make room for expansion.

Fig. 1 is an end sectional view, and Fig. 2 an upper view, of the mold, $a$ being the slats on which rest the mold, $f$ the sides, and $e$ the ends of the mold, $c$ being the lining, and $d$ the vent-block. Fig. 3 is a side sectional view, the parts shown as in the other figures, the block $d$ floating on the water, as also in Figs. 1 and 4.

The tenon $g$ and key $h$ are so constructed as to allow the removal of the mold when the ice is formed.

The molds are to be arranged singly, or in tiers of two or more, one above the other, and, when arranged in tiers, each mold to project beyond the one above, to catch any surplus water, one of the ends $e$ of each mold, which is over the projecting end of the mold beneath, to be slightly lower than the other three sides, to allow the surplus water to flow in that direction.

What I claim as new, and desire to secure by Letters Patent, is—

1. The freezing-mold B, having the sides $f\ f$ provided with end tenons, and the sides $e\ e$ provided with end mortises, in combination with the keys $h\ h$ and slatted removable frame, substantially as and for the purpose set forth.

2. The freezing-mold B, having the upper edge of one of its sides $f$ lower than the other three sides, substantially as and for the purposes set forth.

3. The greased lining C, in combination with the freezing-mold B, constructed as set forth, and slatted frame A, substantially as described, and for the purposes set forth.

4. The frame A, provided with end pieces $b\ b$ and slats $a\ a$, having interstices between them, substantially as described, and for the purpose set forth.

In testimony whereof I have hereunto set my hand and seal in the presence of witnesses.

CHARLES WHITAKER. [L. S.]

Witnesses:
J. A. RYAN,
H. H. BILLS.